United States Patent Office 2,929,166
Patented Mar. 22, 1960

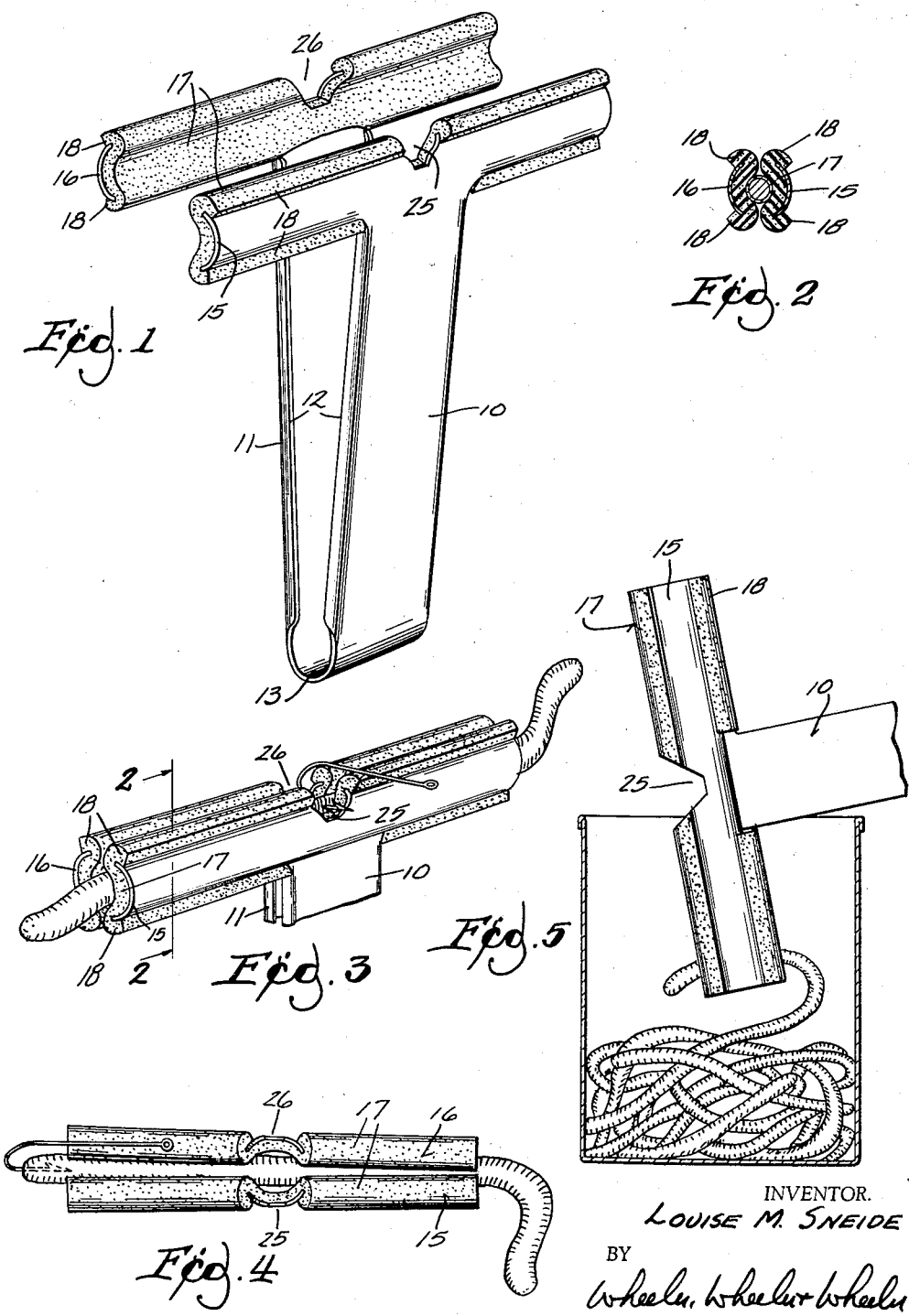

2,929,166
FISH WORM HANDLER

Louise M. Sneide, Milwaukee, Wis.

Application March 27, 1959, Serial No. 802,402

3 Claims. (Cl. 43—4)

This application relates to improvements in fishing worm handlers.

The invention comprises broad handled tongs with padded jaws shaped for convenient handling of fishing worms for insertion of the fish hook. The object of the invention is to provide a device which is cheaply manufactured, which is capable of handling a worm without injury to the worm and without contact between the operator and the worm, and which permits ready insertion of the fish hook in any of the standard ways.

Fig. 1 is a perspective view of my fish worm handler.
Fig. 2 is a cross-sectional view on line 2—2 of Fig. 3.
Fig. 3 is a perspective view of the jaws of my handler with a worm held therein.
Fig. 4 is a top plan view showing the jaws released slightly at one end for insertion of a hook longitudinally of the worm.
Fig. 5 is a view showing how my device may be used to remove worms from a bucket or a can.

My device consists of a tongs having sides 10 and 11, each of which is provided with stiffening flanges 12 over most of their length. Connecting portion 13, which may be integral with the handle portions 10 and 11, is left without flanges to permit it to act as a spring loaded hinge.

Jaws 15 and 16 are provided at the ends of the respective handles 10 and 11, the jaws having considerable lateral extent and being curved about a lateral axis. Each jaw is provided with a cushion 17 on its inner face, which may be adhesively secured to the concave facing sides of jaws 15 and 16. Cushion 17 may also be folded over at edges 18 and adhesively secured to the convex outside surface of jaws 15 and 16. The ends of cushion 17 may similarly be bent over the ends of jaws 15 and 16, if desired. Securing the cushion to the outside of jaws 15 and 16 tends to cover any sharp edges which may be present.

Cushion 17 may be made of foam rubber, foam plastic, or any similar soft and yieldable material.

Jaws 15 and 16 are notched downwardly at their upper edges as shown at 25 and 26, notches 25 and 26 being aligned to present a single notch extending to the center line of concave jaws 15 and 16 when the jaws are closed, thus exposing the center of the worm for insertion of the hook laterally through the worm as shown at Fig. 3. Other notches may be spaced along jaws 15 and 16 as desired.

As shown in Fig. 4, the handles, 10 and 11 of the tongs are of such breadth that one end of jaws 15 and 16 may be held tightly closed, while the other end may be permitted to spring open slightly to accommodate the shank of a hook while it is being inserted longitudinally into the worm.

As shown in Fig. 5 the ends of jaws 15 and 16 are of such length as to readily enter the standard tin can, so that a worm may be removed from the can without touching it. The worm may then be temporarily laid on a flat surface and picked up again so as to occupy the space created by the concavity of jaws 15 and 16.

Thus it will be seen that my invention comprises a fishing worm handler which completely eliminates the necessity for handling the worms, which permits insertion of the fish hook in all of the standard ways, and which protects the worm from other injuries.

I claim:

1. A pair of tongs for handling fishing worms, comprising handle portions sufficiently broad to be adapted to be closed on one side while the other side remains open, and elongated jaws, said jaws being inwardly concave in their short dimension, padding covering the inner surface of each jaw, each jaw and the padding being deeply marginally notched in its longitudinal edge to a depth sufficient to expose the central cavity.

2. A fishing worm handler comprising a tongs made of flat sheet material and having a springy hinge portion bent nearly 180°, handle portions integral with said hinge portion and longitudinally flanged at each margin for strength, lateral jaws integral with said handles, said handle portions and said hinge portion being of sufficient breadth and said hinge portion being of sufficient strength so that the operator may apply closing force to one lateral margin of said handles fully close only one side of said jaws, said jaws being inwardly concave about a lateral axis, soft yieldable padding covering the inner concave faces of said jaws whereby to hold a fishing worm without injury, and deep notches in the margins of said jaws extending toward the lateral axis about which said jaws are concave, said notches in the respective jaws being aligned.

3. The device of claim 2 in which said padding is recurved about the edges of said jaws and secured to the outer face thereof.

References Cited in the file of this patent

UNITED STATES PATENTS

| | | |
|---|---|---|
| 1,634,856 | Skroch | July 5, 1927 |
| 2,839,325 | Jeanfavre | June 17, 1958 |
| 2,857,705 | Woodcock | Oct. 28, 1958 |

OTHER REFERENCES

Popular Mechanics, April 1954, page 113, vol. 101, No. 4.